United States Patent
Bradbury

[19]

[11] Patent Number: 6,070,571
[45] Date of Patent: Jun. 6, 2000

[54] PORTABLE BARBECUE GRILL

[76] Inventor: James H. Bradbury, 4485 Meadowlark La., Santa Barbara, Calif. 93105

[21] Appl. No.: 09/196,694

[22] Filed: Nov. 20, 1998

[51] Int. Cl.[7] .................................................. A47J 33/00
[52] U.S. Cl. ........................... 126/30; 126/9 R; 126/25 A
[58] Field of Search .................................. 126/9 R, 9 B, 126/25 A, 25 R, 30, 29; 248/218.4, 122.1, 123.11

[56] References Cited

U.S. PATENT DOCUMENTS

| | | | |
|---|---|---|---|
| 1,666,293 | 4/1928 | Lorton | 126/30 |
| 2,604,884 | 7/1952 | Walker | 126/30 |
| 2,827,846 | 3/1958 | Karkling | 126/25 R |
| 2,844,139 | 7/1958 | Lucas | 126/30 |
| 3,067,734 | 12/1962 | Lucas | 126/30 |
| 3,152,536 | 10/1964 | Lucas | 99/397 |
| 3,162,113 | 12/1964 | Tallaksen | 99/446 |
| 3,195,531 | 7/1965 | Groff | 126/30 |
| 4,083,354 | 4/1978 | Claire et al. | 126/30 |
| 4,117,825 | 10/1978 | Robertson | 126/29 |
| 4,351,312 | 9/1982 | Ivy | 126/30 |
| 4,607,608 | 8/1986 | Allred et al. | 126/30 |
| 4,854,297 | 8/1989 | Shuman | 126/30 |
| 4,979,490 | 12/1990 | Nudo et al. | 126/30 |
| 5,307,797 | 5/1994 | Kleefeld | 126/30 |
| 5,329,917 | 7/1994 | Young | 126/29 |
| 5,447,096 | 9/1995 | Bürge et al. | 99/339 |
| 5,819,718 | 10/1998 | Leiser | 126/30 |
| 5,848,584 | 12/1998 | Brog | 126/30 |

Primary Examiner—Ira S. Lazarus
Assistant Examiner—Sara Clarke
Attorney, Agent, or Firm—Kenneth J. Hovet

[57] ABSTRACT

An outdoor portable grill is provided having a cooking assembly comprising a food support, a handle for the food support and a handle holder interconnecting the food support with the handle. A support assembly is also provided comprising a upstanding slider post extending from an attachment bracket. The attachment bracket is used to secure the post to an outdoor heat source fixture such as a campground grill or fire pit ring. The handle holder is provided with an engagement opening having multiple inner edges that engage corresponding surfaces on the slider post. The weight of the food support causes the edges to frictionally engage the post exterior. This action allows the food support to be locked into an infinite variety of vertical and radial positions. The handle is pivotally attached to the handle holder for enabling the handle to be rotated against the food support for compact storage. The slider post attachment bracket includes eyebolts for tightly drawing the bracket against the edge structure of a heat source fixture. Alternatively, the eyebolts may extend through corresponding openings in the heat source fixture and allow the bracket to be secured to be fixture exterior.

12 Claims, 4 Drawing Sheets

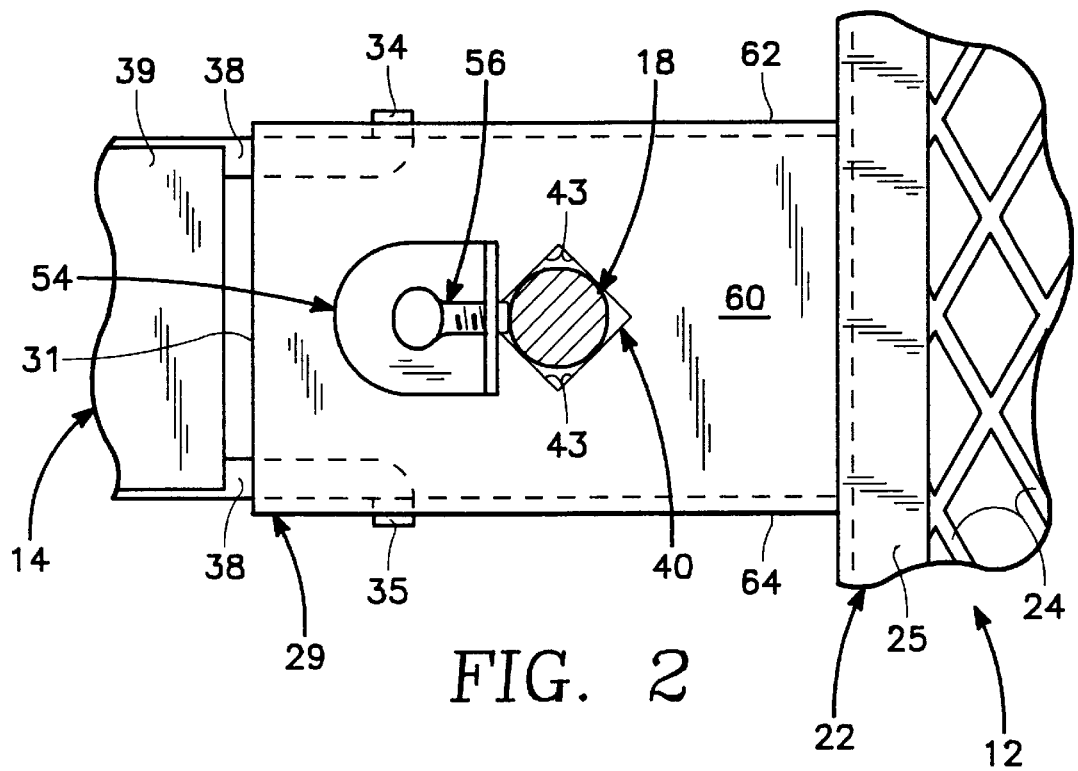
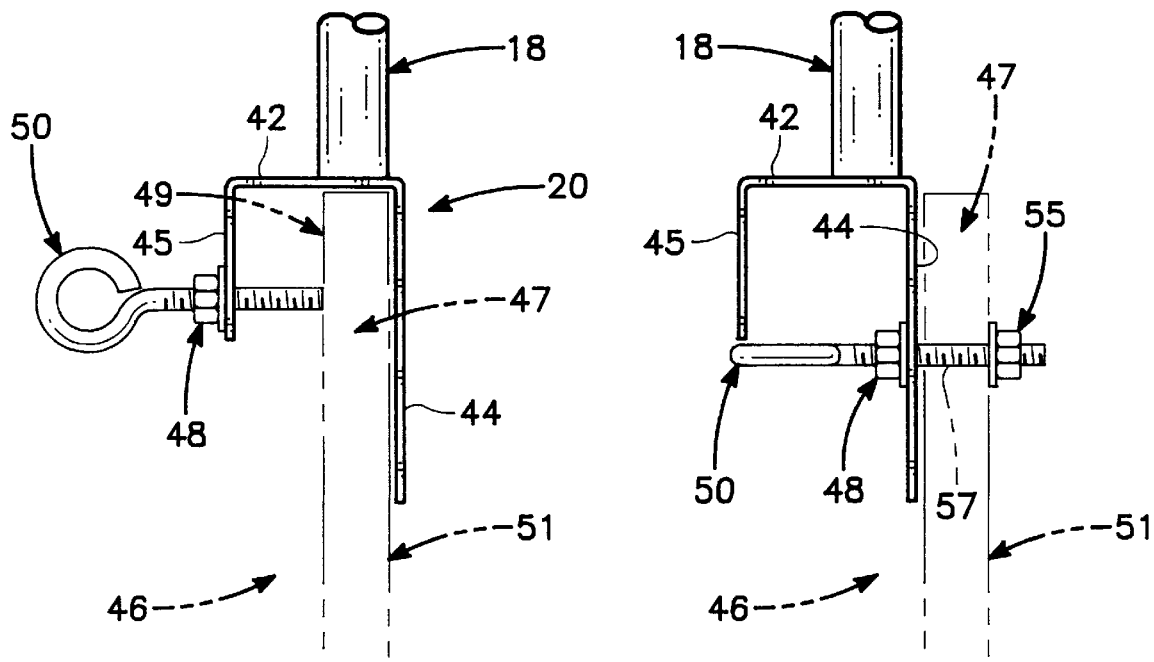
FIG. 2
FIG. 3
FIG. 4

PORTABLE BARBECUE GRILL

BACKGROUND OF THE INVENTION

1. Field of the Invention

The invention relates generally to a portable barbecue grill for cooking food outdoors. More particularly, it concerns a grill that is convenient to use, fully adjustable and collapsible for compact storage.

2. Description of Related Art

Due to the increasing popularity of outdoor activities, there is a corresponding increase in the need for preparing meals outdoors. As a result, a variety of barbecue grill assemblies have been developed. Many of these assemblies include a means for providing a heating source including a reservoir to constrain the heating source such as wood, charcoal or propane gas. The assemblies also include a device for supporting food over the heating source. The food support devices often include grilling means constructed of parallel metal rods having mechanisms for vertical adjustment above the heating source. However, these types of assemblies are oftentimes bulky, heavy and complicated to use.

In many locations for outdoor activities, such as parks, beaches or campgrounds, there are permanent grill fixtures or fire pit rings that can be used for cooking or for ambient heat. Typically, these outdoor fixtures are constructed such that the heat source and grill assembly are spaced apart a fixed distance. This creates difficulties in cooking different foods having a variety of heating requirements. Additionally, the outdoor fixtures are frequently damaged or unsanitary because of repeated use without cleaning. In other instances, the outdoor fixtures do not have an assembly for supporting food or the food support is missing or broken.

To overcome the above difficulties, a variety of outdoor cooking assemblies have evolved. U.S. Pat. No. 5,329,917 discloses a collapsible fire ring having a clamp supporting a tubular rod within which extends a rotatable L-shaped rod. One leg of the rod extends into the tubular support and the other end of the rod is used for suspending cookware over the heat source. This system does not permit vertical adjustment nor is the L-shaped rod readily stowed.

U.S. Pat. Nos. 3,067,737 and 3,152,536 seek to overcome the above problem by providing an upstanding post from which extends a hanging grill. The grill is suspended by articulated arm devices that allow the grill to be raised and lowered relative to a heat source. The upstanding post includes a clamping means for securement to a fire pan. A problem with the above is that the grill is not readily rotated about the axis of the support rod. Additionally, it involves a complicated arrangement of pivot arms, handles, hooks and notched positioning elements.

U.S. Pat. No. 2,604,884 discloses a simplified cooking stand in which a flat upstanding support bar is connected to a U-shaped base. A grill is attached to the upstanding support bar which includes a cross piece for engaging the bar at selected vertical positions. Engagement is accomplished by tightening an opposing set screw and drawing the cross piece of the grill against the narrow edge of the upstanding support bar.

A significant disadvantage of the above is that no axial rotation of the grill can be made. Also, frictional engagement of the cross piece against the support bar edge is very weak due to the small surface area of the support bar edge. Overall, the grill assembly is unstable and unsafe.

SUMMARY OF THE INVENTION

The present invention provides a fully adjustable, easily storable, outdoor barbecue grill assembly that can be readily attached to heat source fixtures such as outdoor grill structures, fire pit rings, tubs and related homemade vessels. The grill assembly can easily be translated vertically and horizontally and become securely locked into an infinite number of vertical and radial positions.

More particularly, the invention includes a cooking assembly comprising a food support for positioning food over a heat source, a handle for moving the food support, and a post engagement means attached to, and interposed between the food support and handle. The invention further includes a support assembly comprising a slider post for holding the cooking assembly and an attachment bracket for securing the slider post to a heat source fixture.

The slider post passes through an engagement opening in the post engagement means. This allows the overall cooking assembly to move up or down the slider post or be rotated about the slider post longitudinal axis.

The post engagement means provides for releasable securement of the cooking assembly at selected locations on the slider post. It utilizes a gravity induced frictional engagement system between the outer surface of the post and the inner edges of the engagement opening. The weight of the food support creates significant leverage about the points of contact between the inner edges and post surfaces. This results in an effective surface gripping force which is sufficient to maintain whatever position a user selects for the cooking assembly.

The invention further consists of an attachment bracket secured to the bottom end of the slider post. The attachment bracket includes releasable fastening means for connecting the bracket and post to an outdoor grill fixture.

BRIEF DESCRIPTION OF THE DRAWINGS

FIG. 2 is an enlarged fragmentary bottom view of the post engagement means taken along lines 2—2 of FIG. 1.

FIG. 3 is an enlarged side elevational view of the attachment bracket of the invention taken along lines 3—3 of FIG. 1.

FIG. 4 is an enlarged side elevational view similar to FIG. 3 illustrating an alternative connection to a heat source fixture shown in phantom.

DESCRIPTION OF THE PREFERRED EMBODIMENTS

Figure 1:
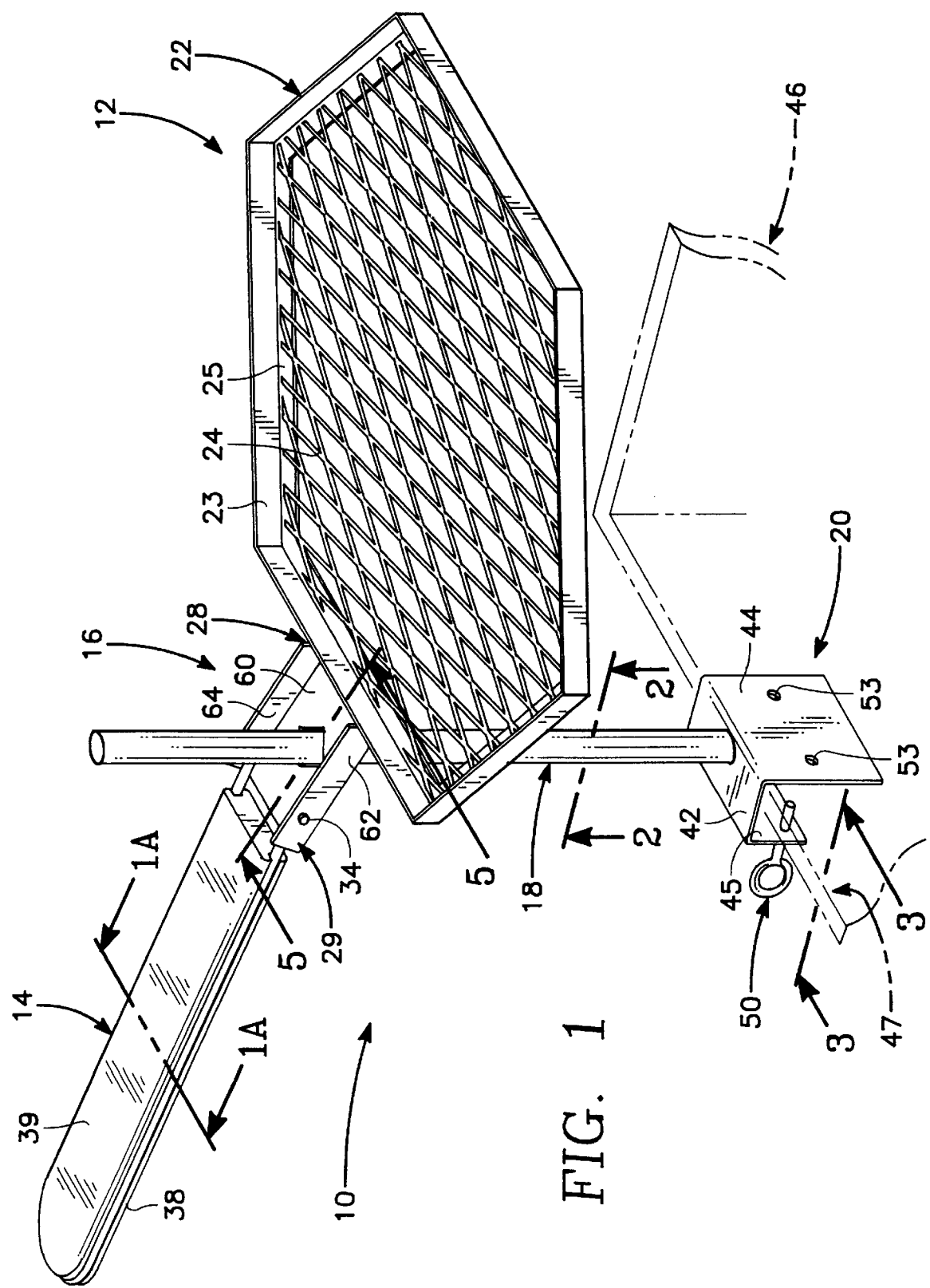
FIG. 1 is a front isometric view of the present invention attached to a heat source fixture depicted in phantom.

With reference now to the drawings, the overall grill assembly is shown in FIG. 1 and referenced generally by numeral 10. The grill assembly comprises a food support 12 to which is fixed the post engagement means shown as handle holder 16. A handle 14 is hingedly attached to the handle holder and a slider post 18 extends through an engagement opening 40 in the handle holder. An attachment bracket 20 is secured to the end of the slider post for releasably connecting the post to a heat source fixture 46.

The food support consists of a grill frame 22 made of angle iron stock comprising an upright leg 23 and a right angle support leg 25. The grill frame may be formed into a round or polygonal shape. As shown, the frame is bent into a hexagonal shape creating an interior area within which is placed a grillwork 24. The grillwork is cut to rest upon support leg 25. It may be fixed to the support leg or may be loose and removable for cleaning and replacement. The grillwork and frame are constructed of known fireproof materials such as metal, ceramics or glazed heat resistant structures. The grillwork structure may comprise expanded metal grating, parallel bars or rigid wire mesh.

Figure 5:
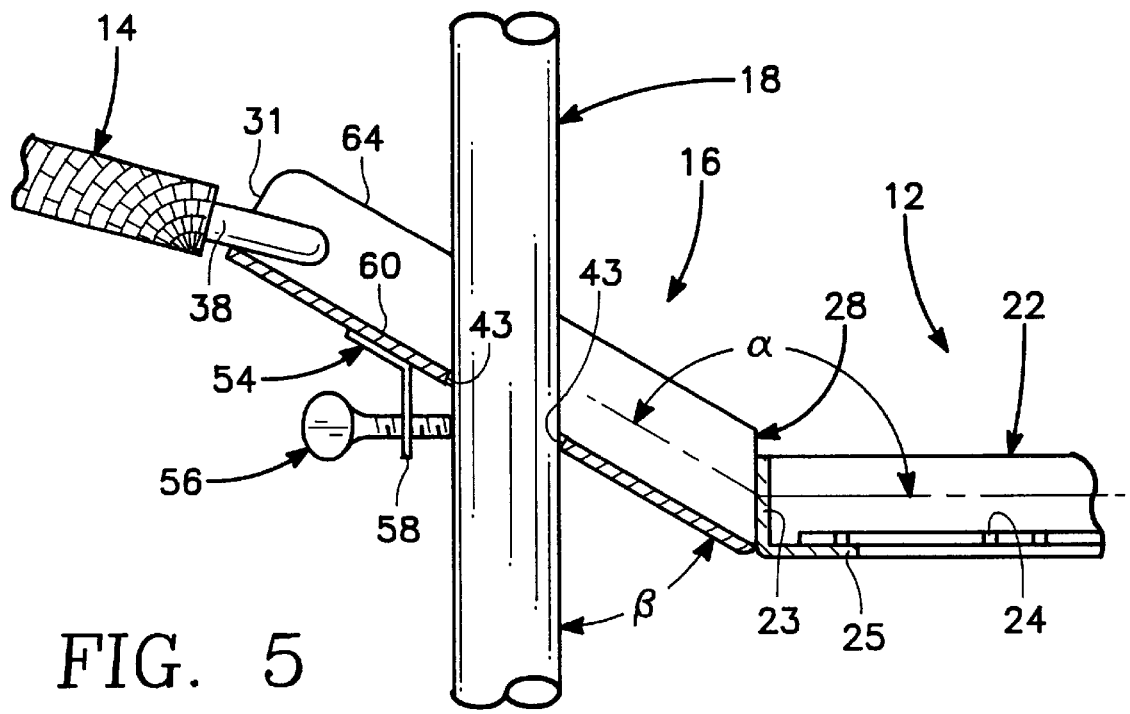
FIG. 5 is an enlarged fragmentary cross-sectional side view taken along lines 5—5 of FIG. 1 showing the post engagement means in a locked position.

The handle holder 16 is generally U-shaped in cross-section comprising a base plate 60 from which extend opposing side flanges 62,64. The holder has a grill end 28 and an opposing outer end 31. The grill end is fixed at an angle Alpha to upright leg 23 of the grill frame 22 by welding or fastening means known in the art. The angle Alpha between the grillwork plane and base plate plane is related to the size of engagement opening 40 and the diameter of slider post 18. The objective is to have the grillwork horizontal when the handle holder is in a locked position as shown in FIG. 5. Thus, the angle Beta will be less than 90°. If the difference between the post diameter and engagement opening is larger, the angle Beta between the post and base plate will be less. Angle Alpha will also be less. If there is less difference, angles Alpha and Beta will be larger. The preferred range for Alpha is 110–170°. The preferred range for Beta is 45–85°.

Figure 1A:
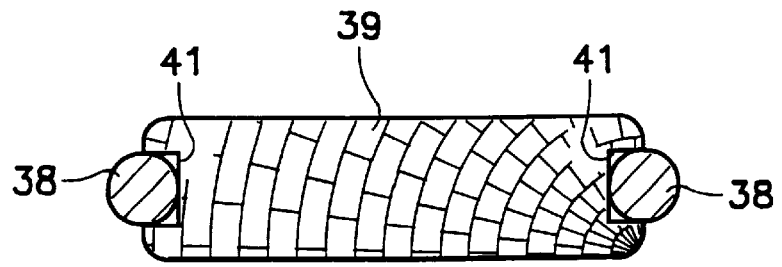
FIG. 1A is an enlarged cross-sectional view of the handle of the invention taken along lines 1A—1A of FIG. 1.

As shown in FIG. 2, the handle holder 16 includes an engagement opening 40 for allowing the slider post 18 to pass through. In the preferred embodiment, the opening is square but could have a round outline 40*a* as shown in FIGS. 1C and 1D and/or a polygonal shape as shown in FIG. 1. The inner edges 43 of the opening function as a locking means for releasably securing the grill to the post at selected vertical and radial positions.

The minimum distance between opposing inner edges must be slightly larger than the diameter of the slider post. Also, the weight of the food support 12 must be greater than the weight of the handle 14. Therefore, once the inner edges grip respective surfaces of the slider post, gravity will cause the handle holder to pivot downwardly about the grip contact points in the direction of the food support.

A significant advantage of the frictional engagement system is the ability to securely lock the cooking assembly in place without the use of set screws, post notches, cams, pins and related means. This is possible because there is always at least two gravity-induced contacts that occur per placement of the cooking assembly.

Figure 1B:
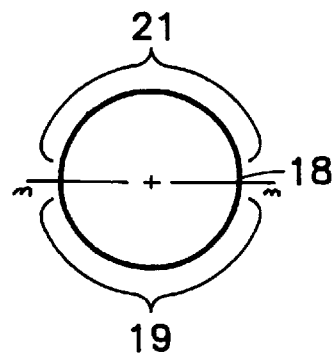
FIG. 1B is a schematic top plan view of the slider post shown in FIG. 1.
Figure 1C:
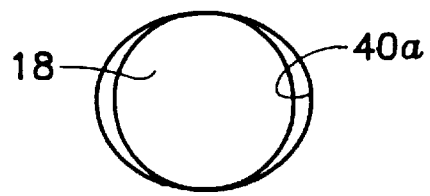
FIG. 1C is a schematic top plan view of the slider post shown in FIG. 1 depicting an alternative connection with a circular engagement opening.
Figure 1D:
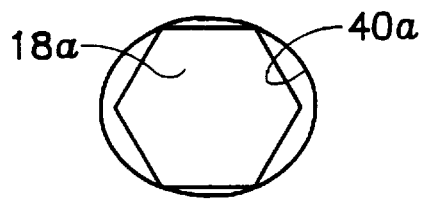
FIG. 1D is a schematic top plan view of an alternative slider post having a hexagonal cross-section in engagement with a circular engagement opening.

As depicted in FIG. 1B, the slider post is divided into two half segments extending along its longitudinal extent on opposing sides of a median line m,m. The front half 19 is defined as the exterior surfaces on the half segment closest to the food support. The back half 21 comprises the exterior surfaces of the post rearward of the median line. Therefore, when the handle holder comes to a secured downwardly inclined position, the handle holder inner edges will be in engagement with at least one friction engagement point in the front half surface 19 of the slider post and at least one friction engagement point in the back half surface 21. These engagements occur simultaneously when the food support is in an operative position. It can also be seen that more weight on the grillwork will cause more leverage and edge engagement force against the slider post.

The slider post may have a round or polygonal cross-section. As shown in FIG. 1D, post 18*a* has a hexagonal cross-section and the engagement opening 40*a* is circular. Most importantly, the post must provide a sufficient amount of exterior surface for creating an effective frictional engagement with the aforementioned inner edges 43. As such, the post diameter will relate to the size and shape of engagement opening 40. In general, the diameter will be slightly less than the shortest distance between opposing inner edges of the engagement opening.

As shown in FIG. 1, the post is a solid cylindrical shaft. It could also be tubular. Its length should be sufficient to provide a full range of vertical height adjustments for the grill above a heat source.

The bottom end of the slider post is fixed to an attachment bracket 20. The bracket, in turn, provides a releasable connection to a heat source containment means such as the heat source fixture 46 depicted in phantom in FIG. 1. The bracket has a J-shaped outline comprising an upper plate 42 having opposing side edges. From one side edge extends an abutment plate 44. From the opposing side edge extends an offset plate 45. Although the bracket could have a U-shape, a more stable connection results when the abutment plate is longer than the offset plate. It will also be appreciated that the upper plate has a width that is sufficient to space-apart the opposing plates a distance which is adequate to accommodate a variety of heat source fixtures.

The bracket includes fastening means for providing a strong releasable connection to the upper edge structure of a heat source fixture. The upper edge structure is shown in phantom by reference 47 in FIGS. 1, 3 and 4. The fastened means includes at least one threaded fastener for operatively engaging corresponding threaded openings in the bracket. As shown, the fastening means comprises two threaded eyebolts 50,50 extending through respective threaded apertures in offset plate 45. The eyebolts are spaced apart and extend through the lower portion of the offset plate.

In the embodiment shown in FIG. 3, the bracket 20 is placed over edge structure 47 with the offset plate on the outside of the structure and the abutment plate on the inside. The bracket is lowered until the top of the edge structure engages the upper plate underside. Both eyebolts are then rotated until their free ends contact the edge structure outer face 49. Rotation of the bolts is continued until abutment plate 44 is drawn tightly against the edge structure inner surface 51.

To insure the eyebolts do not become loosened, a fastener locking means may be provided. This comprises a jam nut/lock washer combination shown by reference 48. Other means such as plastic grommets, keys, pins and thread-lock preparations could also be used.

In the embodiment shown in FIG. 4, the entire bracket is positioned outside the edge structure so that abutment plate 44 is directly adjacent outer face 49. In this version, the abutment plate midportion is provided with fastener openings 53. Edge structure 47 is provided with corresponding wall apertures 57. The apertures are sized to permit the threaded fasteners, shown as eyebolts 50,50, to pass through the edge structure thickness and extend beyond inner surface 51.

With the above arrangement, the original jam nut/lock washer combinations are first threaded onto respective eyebolts. The eyebolts are then passed through the respective wall apertures 57 and abutment plate fastener openings 53. A second jam nut/lock washer combination 55 is rotated about each free end of the eyebolts until the abutment plate is drawn tightly against edge structure outer face 49. A very stable connection occurs which is most commonly utilized when a homemade vessel constitutes the heat source fixture.

The handle comprises an elongated rigid structure which is sized to accommodate grasping with a user's hand. Preferably, it may include heat insulative materials. It is attached to connector end portion 29 of the holder and is generally aligned coextensively with base plate 60. It can be fixed to the plate by welding or fastening means known in the art. However, to effect collapsibility and compact storage, the handle is preferably hingably attached to the base plate. For this purpose, the connector end portions 29 of side flanges 62,64 are provided with hinge openings. Each hinge opening is offset inwardly from the holder outer end 31 for a purpose to be hereinafter described.

As best shown in FIG. 1, the basic handle structure comprises a rod 38 bent into an elongated U-shape. The free outer end portions of the rod are flared outwardly in opposite directions to form hinge parts 34,35. Each hinge part extends through a corresponding hinge opening in the side flanges of handle holder 16. This connection forms a hinge joint whereby the handle can rotate outwardly from the handle into an operative position as illustrated in FIG. 1. When the handle holder is separated from slider post 18, the handle may be rotated over the handle holder and against the grill for compact storage.

To facilitate grasping the handle and avoid excessive heat, rod 38 may include a heat insulative means such as a non-heat conductive sleeve, wrap or encasement of plastic, cloth or wood. As shown in FIGS. 1 and 1a, a major portion of the space between the bent rod 38 is provided with a heat insulative wood insert 39. The insert is connected to the rod by a peripheral groove 41. Corresponding portions of the rod engage the groove for a secure frictional engagement. Although the insert shown has flat upper and lower surfaces, it could be rounded or contoured to better fit a user's hand. Additionally, other means for insert attachment could be mechanical fasteners or adhesives.

It will be appreciated that the gravity induced engagement means of the invention permits an infinite variety of grillwork positions. Prior to cooking, the handle/grillwork structure can be lifted off the post and transported to a food preparation area for loading with items to be heated. During the heating process, the grillwork can be rotated around the post longitudinal axis and away from the heat source to apply seasoning or to slow the cooking rate.

To help insure that the grillwork remains stationary during cooking, the invention provides an optional tilt constraint means for releasably securing the grillwork in the desired location. The constraint means consists of a locking tab 54 and a thumbscrew 56. The locking tab is attached to the underside of base plate 60 between engagement opening 40 and holder outer end 31. The locking tab includes an inclined flange 58 that extends downward from plate 60 at an angle such that it will be about parallel to slider post 18 when the grillwork is horizontal as shown in FIG. 5. The thumbscrew extends through a threaded opening in flange 58 When the grillwork is located in the desired position, the thumbscrew is rotated until its terminal end engages the slider post. This engagement provides an affirmative abutment wedge between the handle holder and post. Therefore, accidental uplifting of the grillwork and disengagement of the cooking assembly from the slider post is prevented.

FIG. 5 shows the cooking assembly in a normal operating configuration with grillwork 24 in a horizontal position. Upon unscrewing thumb screw 56 away from the post and moving the handle down as shown by Arrow A in FIG. 6, the handle holder will tilt up as shown by Arrow B and inner edges 43 will become released from engagement with the post. This permits free movement of the cooking assembly about the post.

Figure 6:
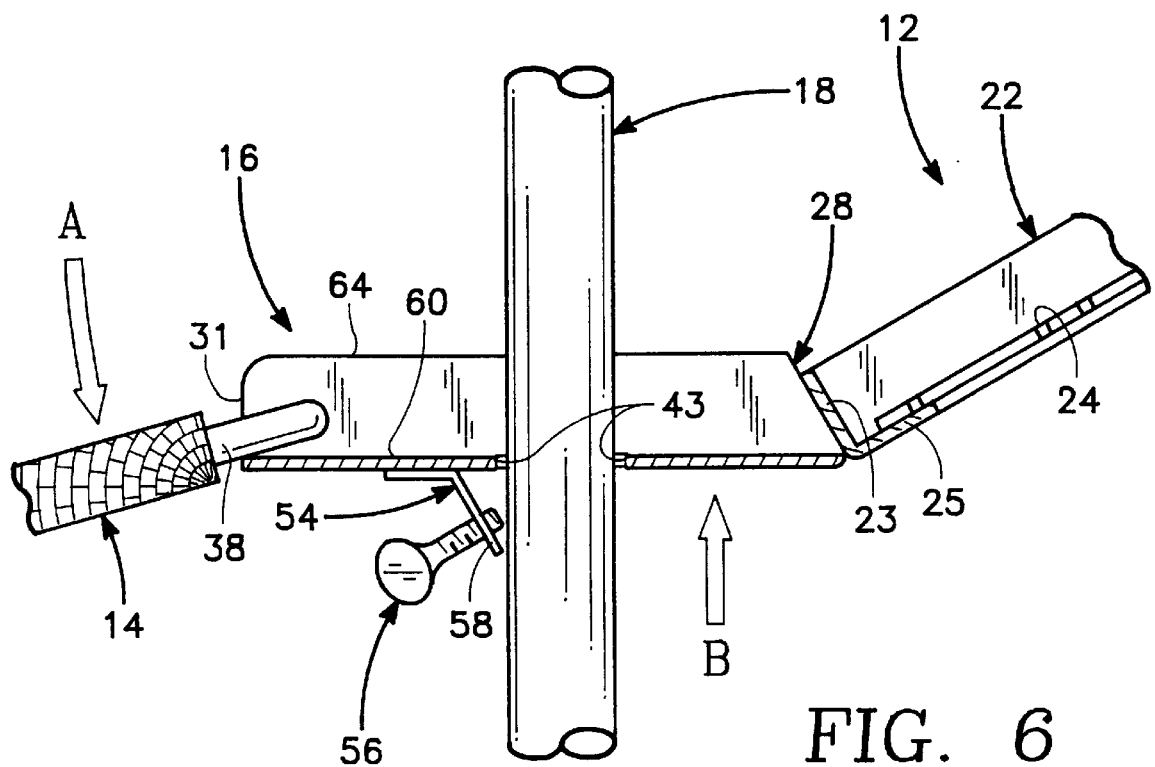
FIG. 6 is a cross-sectional view similar to FIG. 5 showing the post engagement means in an unlocked position.

When the cooking process is completed, the cooking assembly is tilted up as shown in FIG. 6 and removed from the slider post. The grillwork may then be cleaned at a convenient location away from the heat source. Subsequently, the handle is rotated over the handle holder and against the grillwork. The eyebolts of the attachment bracket are loosened and the support assembly is removed from the heat source fixture. It is then placed adjacent the cooking assembly for compact storage.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiments, but only by the scope of the appended claims.

I claim:

1. A grill assembly comprising a cooking assembly which includes a base plate with an engagement opening, said base plate having a grill end and an outer end;

said cooking assembly further including a food support extending angularly from said grill end and a handle extending outwardly from said outer end in a direction about opposite to the direction of said food support;

a slider post having a longitudinal axis extending through said engagement opening;

said engagement opening having multiple inner edges for gripping corresponding surfaces of said slider post when said base plate is aligned at an angle β less than 90° with said longitudinal axis;

wherein said slider post is secured to an attachment bracket having fastening means for releasable attachment to a heat source fixture, said attachment bracket comprising an upper plate from which extends an abutment plate and an offset plate, said fastening means comprising at least one threaded fastener extending through either one of said abutment plate and offset plate to coact with said heat source fixture and releasably secure said bracket to said fixture; and, said heat source fixture having an upper edge structure with one or more wall apertures, said abutment plate having one or more fastener openings corresponding with said wall apertures, said threaded fastener having a free end extending through said wall aperture and said fastener opening, said free end including a fastener locking means to secure said abutment plate against said upper edge structure.

2. The grill assembly of claim 1 wherein said food support is heavier than said handle.

3. The grill assembly of claim 1 wherein said food support includes a grillwork, said base plate defining a plane that extends at an angle α less than 180° with a plane defined by said grillwork.

4. The grill assembly of claim 3 wherein said angle α is sufficient to orient said grillwork in a horizontal position when said inner edges are gripping corresponding surfaces of said slider post.

5. The grill assembly of claim 1 wherein said offset plate has a threaded aperture through which said threaded fastener extends, said threaded fastener having a free end that abuts said heat source fixture when said abutment plate is against said fixture.

6. A portable barbecue grill for use with a heat source fixture having an upper edge structure comprising a support assembly releasably secured to said heat source fixture and a cooking assembly adjustably connected to said support assembly;

said support assembly including a slider post extending upwardly from said heat source fixture and an attachment bracket having an upper plate from which extend an abutment plate and an offset plate which are spaced-apart a distance greater than the thickness of said upper edge structure, said slider post being connected to said upper plate;

including at least one threaded fastener having a free end and a corresponding fastener locking means for engagement with said free end, said upper edge structure and abutment plate having corresponding fastener openings, said free end extending through said fastener openings in tight engagement with said fastener locking means;

said cooking assembly including a base plate through which an engagement opening extends, said base plate having a grill end and an outer end, said food support extending angularly outwardly from said grill end, said engagement opening having inner edges through which said slider post extends;

said food support having sufficient weight to cause said base plate to tilt relative to said slider post and cause said inner edges to frictionally engage said slider post, said cooking assembly including a handle extending from said base plate in a direction about opposite said food support.

7. The grill of claim 6 wherein said slider post has front surfaces and back surfaces, said inner edges being disposed about said engagement opening to engage at least one point on said front surface and at least one point on said back surface.

8. The grill of claim 7 wherein said slider post has a diameter and the minimum distance between opposing inner edges is greater than said diameter.

9. The grill of claim 6 wherein said slider post has about a circular cross-section and the engagement opening has a polygonal or round shape.

10. The grill of claim 6 wherein said heat source fixture has an upper edge structure;

said support assembly including an attachment bracket having an upper plate from which extend an abutment plate and an offset plate;

said slider post being connected to said upper plate;

said abutment plate and offset plate being spaced-apart a distance greater than the thickness of said upper edge structure; and, fastening means operatively engaged to said bracket for releasably securing said bracket to said upper edge structure.

11. The grill of claim 6 including at least one threaded fastener which engages a corresponding threaded aperture in said offset plate, said threaded fastener having a free end which contacts said upper edge structure to secure said bracket to said upper edge structure.

12. A portable barbecue grill for use with a heat source fixture comprising a support assembly releasably secured to said heat source fixture and a cooking assembly adjustably connected to said support assembly;

said support assembly including a slider post extending upwardly from said heat source fixture;

said cooking assembly including a base plate through which an engagement opening extends, said base plate having a grill end and an outer end, a food support extending angularly outwardly from said grill end and said engagement opening having inner edges through which said slider post extends;

said food support having sufficient weight to cause said base plate to tilt relative to said slider post and cause said inner edges to frictionally engage said slider post, said cooking assembly including a handle extending from said base plate in a direction about opposite said food support said handle being hingedly attached to said outer end.

* * * * *